US010797520B2

(12) United States Patent
Suzuki et al.

(10) Patent No.: US 10,797,520 B2
(45) Date of Patent: Oct. 6, 2020

(54) WIRELESS POWER TRANSMISSION SYSTEM, POWER TRANSMISSION DEVICE AND POWER RECEPTION DEVICE

(71) Applicant: KABUSHIKI KAISHA TOSHIBA, Tokyo (JP)

(72) Inventors: Masatoshi Suzuki, Shizuoka (JP); Hiroaki Ishihara, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 607 days.

(21) Appl. No.: 15/701,702

(22) Filed: Sep. 12, 2017

(65) Prior Publication Data
US 2018/0006498 A1 Jan. 4, 2018

Related U.S. Application Data

(63) Continuation of application No. PCT/JP2015/075578, filed on Sep. 9, 2015.

(51) Int. Cl.
*H02J 50/00* (2016.01)
*H02J 50/12* (2016.01)

(52) U.S. Cl.
CPC .............. *H02J 50/12* (2016.02); *H02J 50/00* (2016.02)

(58) Field of Classification Search
CPC .. H02J 50/00; H02J 50/10; H02J 50/12; H02J 7/025; H02J 5/005
See application file for complete search history.

(56) References Cited

U.S. PATENT DOCUMENTS

2014/0139035 A1 5/2014 Ishihara et al.
2014/0375256 A1* 12/2014 Lee .................. H02J 5/005
320/108
(Continued)

FOREIGN PATENT DOCUMENTS

JP  2012-010546  1/2012
JP  2013-074685  4/2013
(Continued)

OTHER PUBLICATIONS

International Search Report from the Japanese Patent Office for International Patent Application No. PCT/JP2015/075578, dated Dec. 15, 2015.

*Primary Examiner* — Richard Isla
*Assistant Examiner* — Johali A Torres Ruiz
(74) *Attorney, Agent, or Firm* — Finnegan, Henderson, Farabow, Garrett & Dunner, L.L.P.

(57) ABSTRACT

According to one embodiment, a wireless power transmission system includes: an AC power source; a power transmission resonator; a power reception resonator; an AC/DC converter; a first circuit disposed between the AC power source and the power transmission resonator; and a second circuit disposed between the power reception resonator and the AC/DC converter. Parameter values of passive elements in the first and second circuits are set so that an absolute value of an inverse transfer function between an input voltage and an output voltage of a target system at a frequency of the AC voltage is equal to or less than a divided value of the AC voltage by a battery voltage while the AC voltage is increased from a first voltage value to a second voltage value, the target system comprising the first circuit, the power transmission resonator, the power reception resonator, the second circuit and the AC/DC converter.

18 Claims, 13 Drawing Sheets

(56) References Cited

U.S. PATENT DOCUMENTS

2015/0015197 A1* 1/2015 Mi ..................... H04B 5/0081
                                                        320/108
2017/0120765 A1  5/2017 Ichikawa

FOREIGN PATENT DOCUMENTS

| JP | 2013-219899 | 10/2013 |
| JP | 2014-010475 | 1/2014 |
| JP | 2014-103751 | 6/2014 |
| JP | 2015-104275 | 6/2015 |
| JP | 2015-139345 | 7/2015 |

* cited by examiner

WIRELESS POWER TRANSMISSION SYSTEM, POWER TRANSMISSION DEVICE AND POWER RECEPTION DEVICE

CROSS-REFERENCE TO RELATED APPLICATIONS

The present invention is a Continuation of International Application No. PCT/JP2015/075578, filed on Sep. 9, 2015, the entire contents of which is hereby incorporated by reference.

FIELD

Embodiments described herein relate to a wireless power transmission system, a power transmission device and a power reception device.

BACKGROUND

Regarding wireless power transmission techniques, it is known that power transmission efficiency varies depending on various parameters such as an impedance of a power supplier that wirelessly supplies power to a power reception-side, an impedance of a power receiver that receives power from the power supplier, an impedance of a load that uses the power received by the power receiver, and a transmission distance. Here, the transmission efficiency (or simply "efficiency") refers to a ratio between power supplied from a power source on a power transmission-side and power received on the power reception-side.

When performing wireless power transmission, it is preferable to set the impedance on the power reception-side to an appropriate value and turn on the power on the power transmission-side. When the impedance is not set to the appropriate value, sufficient efficiency may not be obtained, causing a power increase as well as a power loss.

Conventionally, techniques for implementing transmission of large power with high efficiency are known, which adjust impedance matching with low transmission power and then proceed to power transmission with large power. In this case, techniques are also known, which determine a function that controls a load based on a relationship between transmission power and reception power to charge transmission power into a battery and turn on stable power using the function. Furthermore, techniques of stably turning on transmission power by optimizing a power transmission frequency are also known.

However, even when any of these techniques is used, there are cases where drastic power may enter the power reception-side when a power transmission voltage rises and circuit elements may be damaged by overpower.

DETAILED DESCRIPTION

According to one embodiment, a wireless power transmission system includes: an AC power source configured to generate an AC voltage; a power transmission resonator configured to generate a magnetic field corresponding to the AC voltage; a power reception resonator configured to receive AC power via the magnetic field; an AC/DC converter configured to convert the AC power to DC power and supply the DC power to a battery; a first circuit disposed between the AC power source and the power transmission resonator; the first circuit comprising at least one passive element; and a second circuit disposed between the power reception resonator and the AC/DC converter, the second circuit comprising at least one passive element.

Parameter values of the passive elements in the first circuit and the second circuit are set so that an absolute value of an inverse transfer function between an input voltage and an output voltage of a target system at a frequency of the AC voltage is equal to or less than a divided value of the AC voltage by a battery voltage during a period of time when the AC voltage is increased from a first voltage value to a second voltage value, the target system comprising the first circuit, the power transmission resonator, the power reception resonator, the second circuit and the AC/DC converter.

Hereinafter, embodiments of the present invention will be described with reference to the accompanying drawings.

Figure 11:
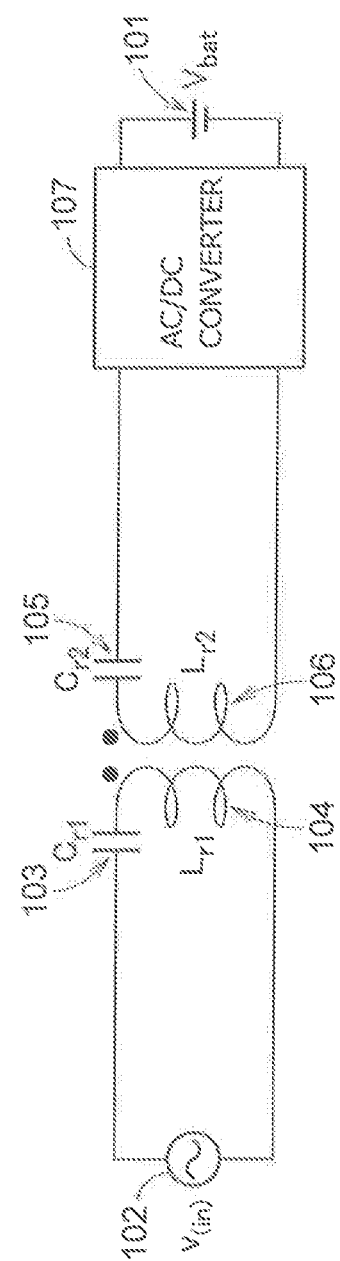
FIG. 11 is a schematic diagram of a basic configuration of a general wireless power transmission system.

FIG. 11 illustrates a basic configuration of a wireless power transmission system. This wireless power transmission system is provided with a power transmission device and a power reception device.

The power transmission device is provided with an AC power source 102, a power transmission capacitor 103 and a power transmission coil 104.

The power reception device is provided with a power reception coil 106, a power reception capacitor 105, an AC/DC converter (rectifier) 107 and a battery 101.

The AC power source 102 in the power transmission device generates AC power (AC voltage and AC current) of a predetermined frequency. The AC power is, for example, high frequency power (high frequency voltage and high frequency current). The AC power source 102 is provided with, for example, a DC power supply and an inverter, and converts a DC voltage generated from the DC power source to an AC voltage through an inverter. In this case, an output voltage of the inverter corresponds to an output voltage of the AC power source 102. The power transmission capacitor 103 and the power transmission coil 104 are connected in series to each other to constitute a power transmission resonator. The power transmission resonator has a resonance frequency having the same or substantially the same value as the frequency of the AC voltage. The power transmission coil 104 generates a magnetic field corresponding to the AC current supplied from the AC power source 102.

A power reception coil 106 and a power reception capacitor 105 in the power reception device are connected in series to each other and constitute a power reception resonator. The power reception resonator has a resonance frequency having the same or substantially the same value as the frequency of AC power generated by the AC power source 102 on the power transmission-side. In coupling with a magnetic field generated by the power transmission coil 104, the power reception coil 106 generates a high frequency current corresponding to the magnetic field. That is, through magnetic coupling between the power transmission resonator and the power reception resonator, power is transmitted contactlessly. The AC/DC converter 107 converts the AC power received by the reception resonator to DC power and supplies the DC power to a battery 101.

Figure 12:
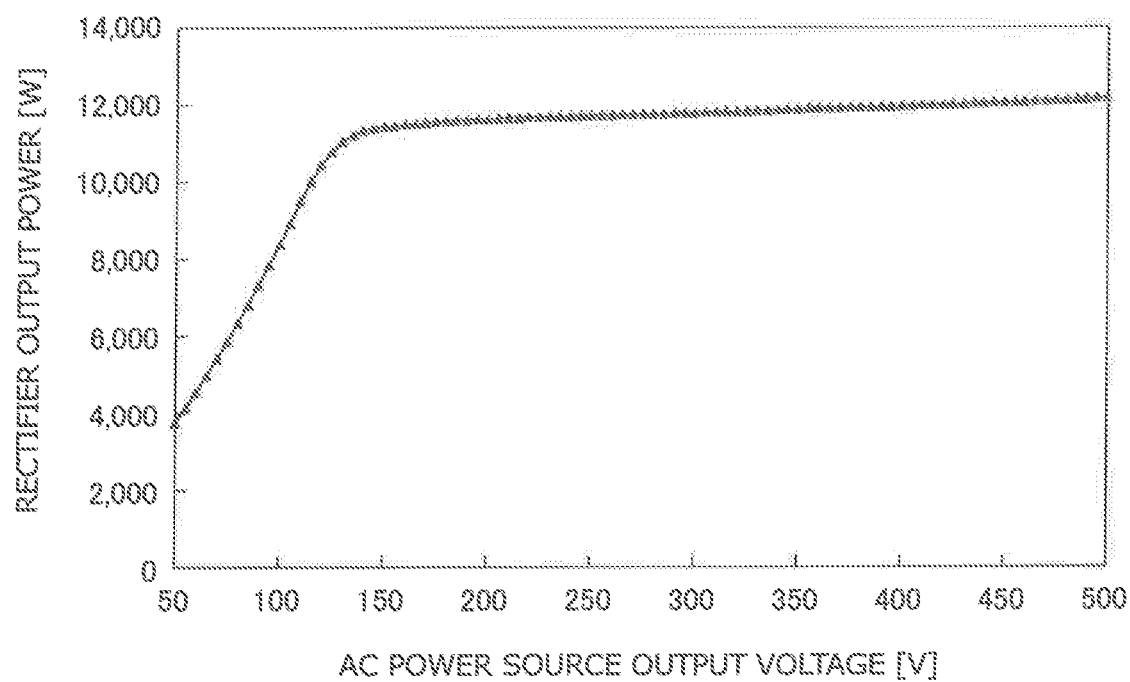
FIG. 12 is a diagram illustrating a characteristic between an output voltage of the AC power source and reception power of the battery in the system in FIG. 11.

FIG. 12 illustrates a characteristic example of supply power (output power of the rectifier) to the battery 101 with respect to the output voltage (output voltage of the inverter) of the AC power source 102 in the wireless power transmission system in FIG. 11.

Within a range in which the output voltage of the AC power source 102 is small, the power supplied to the battery 101 increases almost uniformly. That is, the ratio of the increment of the supply power of the battery 101 to the increment of the output voltage of the AC power source 102 is substantially constant. Therefore, stable operation is possible even when the system transitions to large power transmission by adjusting a load impedance on the power reception-side while gradually increasing the output voltage of the AC power source 102.

Figure 13:
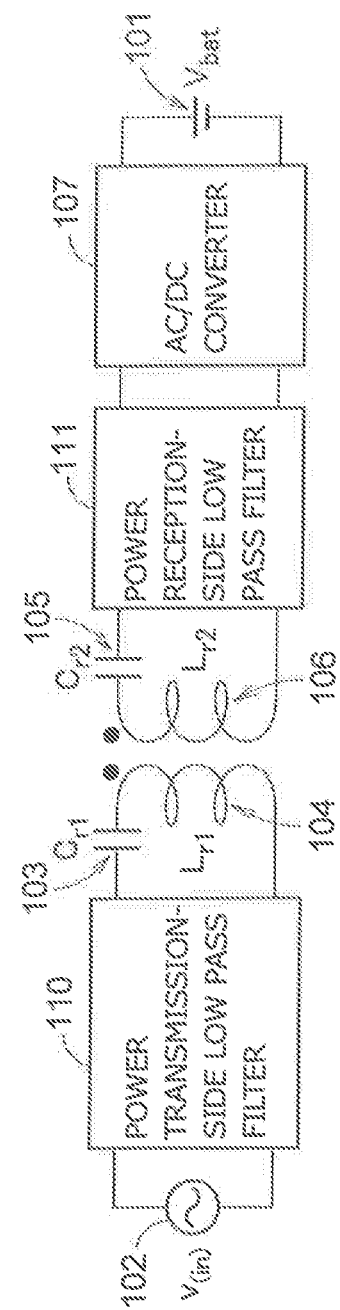
FIG. 13 is a diagram illustrating a configuration with a low pass filter added to the power transmission-side and the power reception-side in the system in FIG. 11.

In recent years, there is a demand for suppression of harmonics in wireless power transmission. For this reason, as measures for harmonics, introduction of a low pass filter or the like to the wireless power transmission system is under study. FIG. 13 illustrates an example where low pass filters are added to the wireless power transmission system in FIG. 11.

A power transmission-side low pass filter 110 is added between the AC power source 102 and the power transmission resonator in the power transmission device. A power reception-side low pass filter 111 is added between the power reception resonator and the DC/AC converter 107 in the power reception device.

Figure 14:
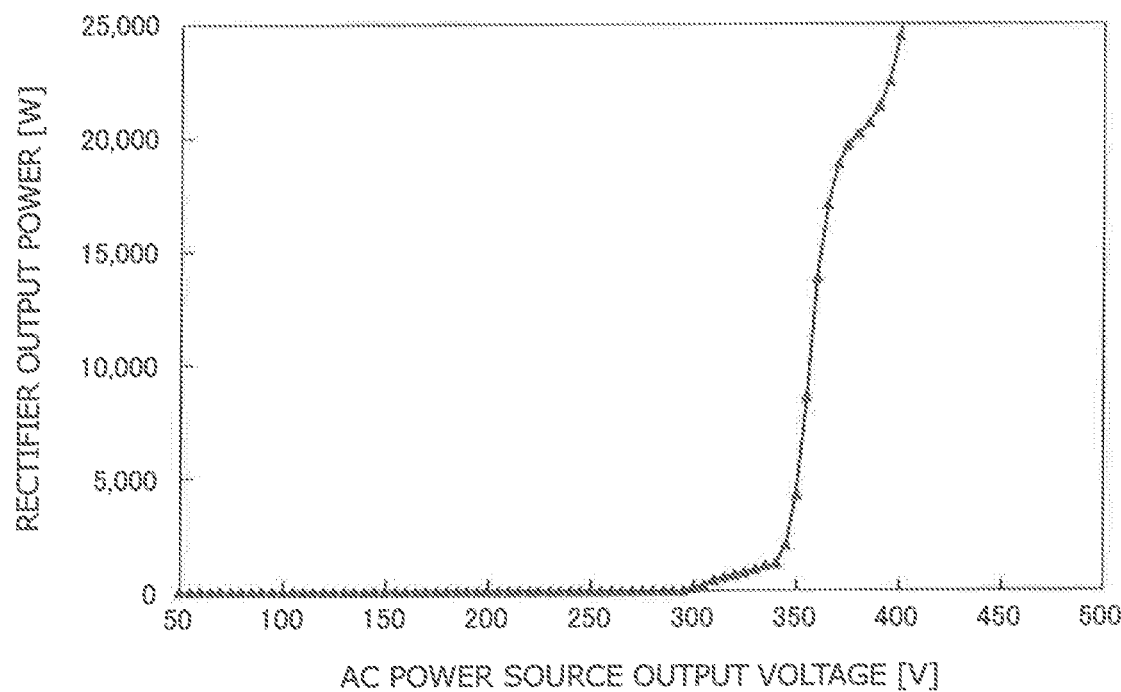
FIG. 14 is a diagram illustrating a characteristic between an output voltage of the AC power source and reception power of the battery in the system in FIG. 13.

FIG. 14 illustrates a characteristic example of the power (output power of the rectifier) supplied to the battery 101 with respect to the output voltage (output voltage of the inverter) of the AC power source 102 in the wireless power transmission system in FIG. 13.

In the configuration with the low pass filters added, when the output voltage of the AC power source 102 is gradually increased from a low value, the power supplied to the battery 101 is zero or substantially zero while the output voltage is smaller than a certain value and gradually increases from a point in the vicinity of 300 V. However, when the output voltage exceeds another certain point (point in the vicinity of 350 V in FIG. 14), drastically increasing power relative to the increase of the output voltage is supplied to the battery 101, and the relationship of the supply power to the battery 101 with respect to the output voltage of the AC power source 102 is no longer uniform from that point. That is, the ratio of the increment of the power supplied to the battery 101 to the increment of the output voltage of the AC power source 102 is no longer constant or substantially constant. For example, after the output voltage exceeds 350 V, the supply power of the battery 101 increases significantly with a small increment of the output voltage of the AC power source 102. For this reason, it is difficult to control the output voltage of the AC power source 102, adjust the load impedance on the power reception-side, that is, control the power supply to the battery 101. Thus, in this configuration, when wireless power transmission is performed while gradually increasing the transmission voltage, there may be a case where the supply power of the battery 101 cannot be controlled appropriately (impedance on the power reception-side cannot be controlled to an appropriate value) and an overcurrent may flow into the components or the like. Therefore, wireless power transmission from the power transmission-side to the power reception-side cannot be started safely.

Figure 15:
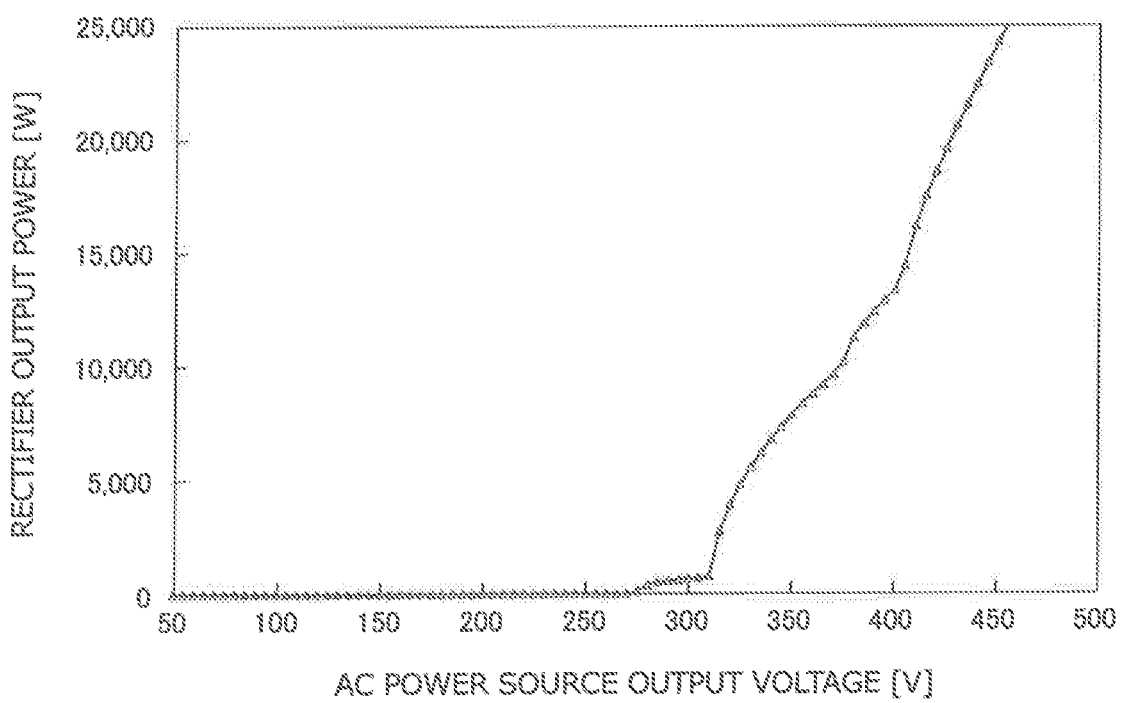
FIG. 15 is a diagram illustrating another example of the characteristic between an output voltage of the AC power source and reception power of the battery in the system in FIG. 13.

Changing a power transmission frequency is known as one of techniques to cope with this problem. Frequency bands available for wireless power transmission are standardized or being prepared for standardization for each application, and only bands having a bandwidth ratio of approximately 11% (±5.5%) of 81.38 to 90 kHz defined by SAE International are currently available for automobiles. Therefore, FIG. 15 illustrates a characteristic example of the supply power (output power of the rectifier) to the battery 101 with respect to the output voltage of the AC power source 102 in the case where the transmitting frequency of the system shown in FIG. 13 is shifted by ±5%. The characteristic in FIG. 15 is slightly improved compared to the characteristic in FIG. 14, but the relationship of the supply power to the battery 101 with respect to the output voltage of the AC power source 102 is still not uniform. That is, especially after the output voltage of the AC power source 102 exceeds a point in the vicinity of 315 V, drastically increasing power with respect to the increment of the output voltage is supplied to the battery 101. The ratio of the increment of the supply power of the battery 101 to the increment of the output voltage of the AC power source 102 is not constant or substantially constant. For this reason, it is not possible to stably start wireless power transmission from the power transmission-side to the power reception-side for the same reason as that described using FIG. 14.

When performing wireless power transmission while gradually increasing the power transmission voltage, the present embodiment can realize stable initiation of a power transmission voltage without generating any overcurrent in components or the like.

First Embodiment

Figure 1:
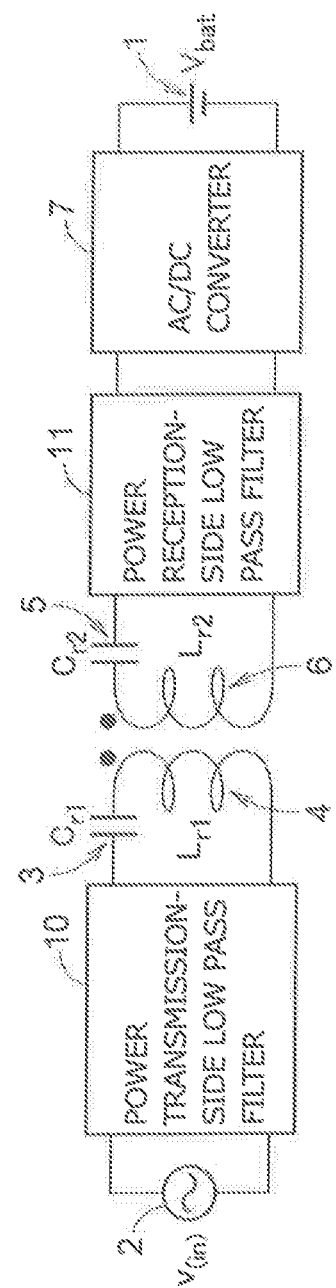
FIG. 1 is a diagram illustrating a wireless power transmission system according to a first embodiment.

FIG. 1 illustrates a wireless power transmission system according to the present embodiment. The wireless power transmission system is provided with a power transmission device and a power reception device.

The power transmission device is provided with an AC power source 2, a power transmission-side low pass filter 10, a power transmission capacitor 3, and a power transmission coil 4. A capacitance of the power transmission capacitor 3 is $C_{r1}$ and an inductance of the power transmission coil 4 is $L_{r1}$.

The power reception device is provided with a power reception coil 6, a power reception capacitor 5, a power reception-side low pass filter 11, an AC/DC converter (rectifier) 7 and a battery 1. A capacitance of the power reception capacitor 5 is $C_{r2}$ and an inductance of the power reception coil 6 is $L_{r2}$. Here, the battery 1 is incorporated in the power reception device, but it may also be disposed outside the power reception device.

The AC power source 2 in the power transmission device generates AC power (AC voltage and AC current) of a predetermined frequency. The AC power is high frequency power (high frequency voltage and high frequency current), for example. The AC power source 2 is provided with a DC power supply and an inverter, for example, and converts the DC voltage generated by the DC power supply to an AC voltage through the inverter. In this case, the output voltage of the inverter corresponds to the output voltage of the AC power source 2. The power transmission-side low pass filter 10 removes a high frequency component from the AC current generated by the AC power source 2 and outputs the AC current without the high frequency component. The power transmission capacitor 3 and the power transmission coil 4 are connected in series to each other to constitute a power transmission resonator. The power transmission resonator has a resonance frequency of the same or substantially the same value as the frequency (fundamental frequency) of the AC voltage generated by the AC power source 2. The power transmission coil 4 generates a magnetic field in accordance with the AC current supplied from the AC power source 2.

The power transmission resonator may have a configuration other than the configuration in which the power transmission capacitor 3 and the power transmission coil 4 are connected in series to each other, and, for example, another power transmission capacitor may be added to a terminal on a side opposite to the power transmission capacitor 3 of both terminals of the power transmission coil 4 or may be disposed as a substitute for the power transmission capacitor 3. The power transmission coil 4 may be a plurality of coils connected in series. A magnetic substance may be disposed inside the power transmission coil 4. Configurations other than those described here may also be adopted.

The power reception coil 6 and the power reception capacitor 5 in the power reception device are connected in series to each other to constitute a power reception resonator. The power reception resonator has the same or substantially the same resonance frequency as that of the power transmission resonator. In coupling with the magnetic field generated by the power transmission coil 4, the power reception coil 6 generates an AC current corresponding to the magnetic field. That is, through magnetic coupling between the power transmission resonator and the power reception resonator, power is transmitted contactlessly from the power transmission-side to the power reception-side. The power reception-side low pass filter 11 removes a high frequency component included in the AC current inputted from the power reception resonator and outputs the AC current of which the high frequency component is removed. The AC/DC converter 7 converts the AC power received at the power reception resonator to DC power and supplies the DC power to the battery 1. The AC/DC converter 7 can be constructed of an arbitrary circuit such as a bridge diode.

The power reception resonator may have a configuration different from the configuration in which the power reception capacitor 5 and the power reception coil 6 are connected in series to each other, and, for example, another power reception capacitor may be added to a terminal opposite to the power reception capacitor 5 of both terminals of the power reception coil 6 or may be disposed as a substitute for the power reception capacitor 5. The power reception coil 6 may be a plurality of coils connected in series. A magnetic substance may be disposed inside the power reception coil 6. Configurations other than those described here may also be adopted.

Here, suppose a system (referred to here as a "target system") in which the power transmission-side low pass filter 10, the power transmission capacitor 3, the power transmission coil 4, the power reception capacitor 5, the power reception coil 6, the power reception-side low pass filter 11 and the AC/DC converter (rectifier) 7 are cascade connected together.

One of features of the present embodiment is that parameter values of the elements making up the power transmission-side low pass filter 10 and the power reception-side low pass filter 11 are set so that an inverse transfer function T (transfer function is 1/T) between an input voltage and an output voltage of the target system satisfies the following expression 1 at the frequency of the output voltage of the AC power source for a period of time during which the output voltage of the AC power source is increased from an initial value to a desired value. $V_{inv}$ is an output voltage of the AC power source 2 and corresponds to the input voltage of the target system. $V_{bat}$ is a battery voltage and corresponds to the output voltage of the target system. |T| is an absolute value of the inverse transfer function. Therefore, this expression means that the reciprocal of the absolute value of the inverse transfer function T becomes equal to or less than a divided value obtained by dividing the input voltage by the output voltage of the target system.

$$|T| \le \left|\frac{V_{inv}}{V_{bat}}\right| \qquad \text{Expression 1}$$

According to this expression, a value obtained by multiplying the reciprocal of the absolute value of the inverse transfer function T (that is, absolute value of the transfer function) by $v_{inv}$ is kept to $V_{bat}$ or greater. Therefore, when the output voltage is gradually increased from the initial value of $v_{inv}$, the power (output power of the AC/DC converter) supplied to the battery 1 fluctuates uniformly or substantially uniformly according to the increment of the output voltage even after power input to the battery 1 is started. This prevents large power from drastically entering the battery 1 in response to an increment of the power transmission voltage and allows a stable rise of the power transmission voltage. In the aforementioned system in FIG. 13, there is a section of the power transmission voltage that does not satisfy at least this expression 1 when the power transmission voltage increases, and, for example, while the power transmission voltage is caused to increase, the load impedance seen from the power transmission-side may drastically fluctuate and power may be drastically supplied to the battery 1. For this reason, an overcurrent or the like may be generated in parts and a non-uniform relationship as shown in FIG. 14 or FIG. 15 may occur.

The following are examples where parameter values of the respective elements of the power transmission-side low pass filter 10 and the power reception-side low pass filter 11 are determined so as to satisfy the aforementioned expression 1. To be more specific, a parameter value representing a filter characteristic of the low pass filter (cutoff frequency in this example) designed so as to satisfy the expression 1 is determined and parameter values of the respective elements are determined and set so as to realize the desired cutoff frequency. The method for determining parameter values of the respective elements so as to realize desired cutoff frequency are self-evident for those skilled in the art, and so an example of determining parameter values representing the filter characteristic is shown below.

Figure 2A:
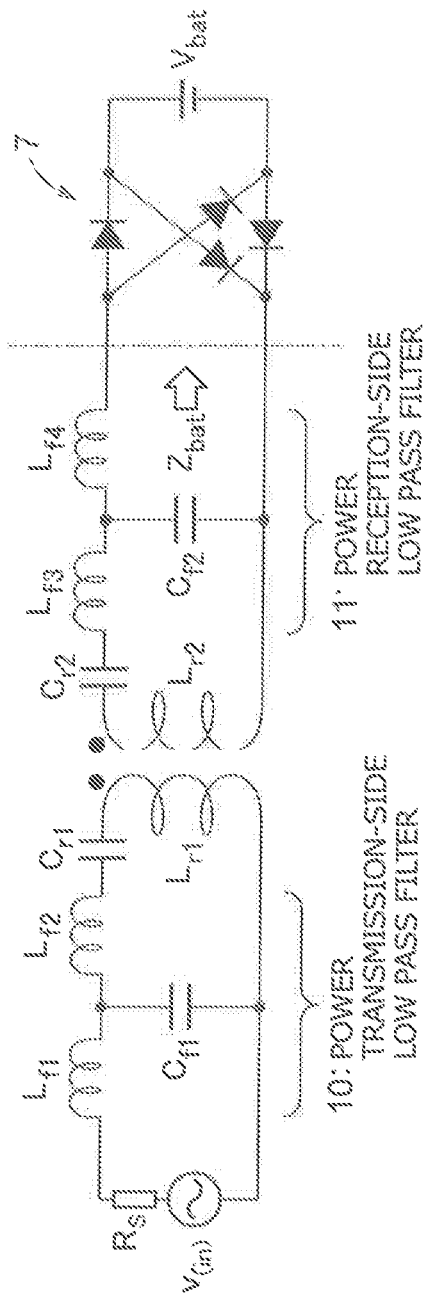
FIGS. 2A and 2B each is a diagram illustrating a specific example of the system in FIG. 1.

FIG. 2A illustrates a specific configuration example of the wireless power transmission system in FIG. 1.

The power transmission-side low pass filter is provided with serially connected coil in and coil $L_{f2}$, and a capacitor $C_{f1}$ connected to a connection point of these coils, parallel to an AC power source (or coil $L_{r1}$ of a power transmission resonator). $L_{f1}$ and $L_{f2}$ represent inductances of the coils, and are also used as reference numerals to denote the coils. $C_{f1}$ represents a capacitance of a capacitor, and is also used as a reference numeral to denote the capacitor.

The power reception-side low pass filter is provided with serially connected coil $L_{f3}$ and coil $L_{f4}$, and a capacitor $C_{f2}$ connected to a connection point of these coils, parallel to a coil $L_{f2}$ of a power reception resonator. $L_{f3}$ and $L_{f4}$ represent inductances of the coils, and are also used as reference numerals to denote the coils. $C_{f2}$ represents a capacitance of a capacitor, and is also used as a reference numeral to denote the capacitor.

The AC/DC converter is constructed of a diode bridge. Rs is an output impedance (output impedance of the inverter) of the AC power source. $V_{bat}$ is a battery voltage.

When a power transmission voltage starts to rise, the AC/DC converter 7 only has a function of increasing the load of the battery 1 at a constant rate, and a load impedance $Z_{bat}$ (see a single-dot dashed line in FIG. 2A) seen from the power transmission-side is considered instead of the load ($R_{bat}$) of the battery 1. Assuming the battery voltage $V_{bat}$=300 V and power supplied to the battery 1 is 500 W when power transmission starts, the load (battery load) of the battery 1 becomes $R_{bat}$=300²[V]/500[W]=180Ω. Furthermore, a load $Z_{bat}$ of the circuit portion after the AC/DC converter seen from the power transmission-side is $Z_{bat}$=(180[Ω])×8/π²≈146[Ω] in consideration of impedance conversion by the AC/DC converter.

Figure 2B:
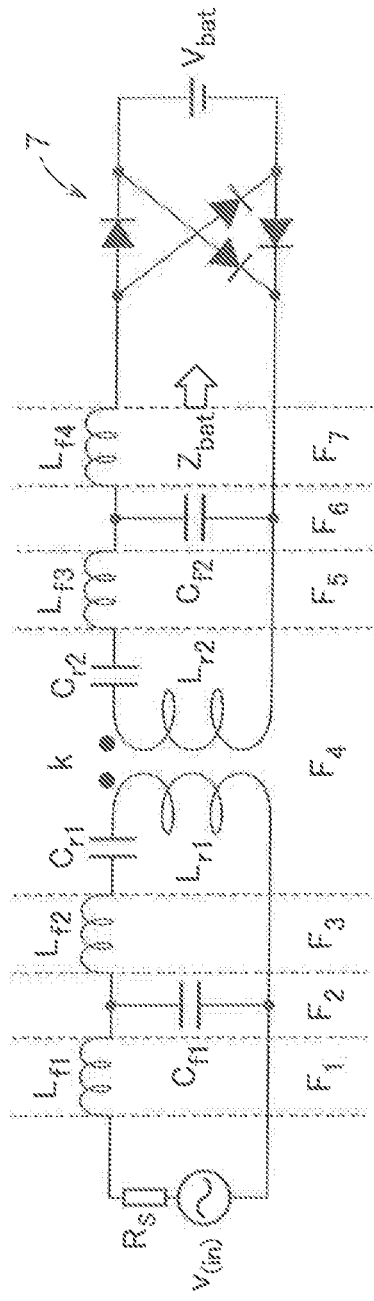

In FIG. 2A, a target system is considered in which the power transmission-side low pass filter 10, the power transmission resonator (power transmission capacitor $C_{r1}$, power transmission coil $L_{r1}$), the power reception resonator (power reception capacitor $C_{r2}$, power reception coil $L_{r2}$) and the power reception-side low pass filter 11 are cascade connected. The target system is divided into a plurality of partial circuits as shown by dotted lines in FIGS. 2B and F matrices of the respective partial circuits are assumed to be $F_1$, $F_2$, $F_3$, $F_4$, $F_5$, $F_6$ and $F_7$. That is, $F_1$ is an F matrix of the coil $L_{f1}$, $F_2$ is an F matrix of the capacitor $C_{f1}$, $F_3$ is an F matrix of the coil $L_{f2}$, $F_4$ is an F matrix of the circuit combining the power transmission resonator ($C_{r1}$, $L_{r1}$) and the power reception resonator ($C_{r2}$, $L_{r2}$), $F_5$ is an F matrix of the coil $L_{f3}$, and $F_6$ is an F matrix of the capacitor $C_{f2}$, $F_7$ is an F matrix of the coil $L_{f4}$. Note that the F matrix is composed of four parameters (F parameters) that express characteristics of two terminal pair circuits stored in respective elements of a matrix.

When the F matrix of the target system is assumed to be $F_{all}$, $F_{all}$ is expressed as follows.

$$F_{all} = \begin{bmatrix} A_{all} & B_{all} \\ C_{all} & D_{all} \end{bmatrix} = F1 \times F2 \times F3 \times F4 \times F5 \times F6 \times F7 \qquad \text{Expression 2}$$

An inverse transfer function T of the target system is expressed by $F_{all}$, an output impedance of the AC power source (output impedance of the inverter) Rs and the aforementioned load impedance $Z_{bat}$ as follows, $$T = A_{all} + \frac{B_{all}}{Z_{bat}} + R_S C_{all} + \frac{R_S}{Z_{bat}} D_{all} \qquad \text{Expression 3}$$

The F matrices $F_1$, $F_2$, $F_3$, $F_4$, $F_5$, $F_6$ and $F_7$ of the respective partial circuits are expressed as follows.

$$F_1 = \begin{bmatrix} 1 & 2\pi f j L_{f1} \\ 0 & 1 \end{bmatrix}$$

$$F_2 = \begin{bmatrix} 1 & 0 \\ 1/2\pi f j C_{f1} & 1 \end{bmatrix}$$

$$F_3 = \begin{bmatrix} 1 & 2j\pi f L_{f2} \\ 0 & 1 \end{bmatrix}$$

$$F_5 = \begin{bmatrix} 1 & 2\pi f j L_{f3} \\ 0 & 1 \end{bmatrix}$$

$$F_6 = \begin{bmatrix} 1 & 0 \\ 1/2\pi f j C_{f2} & 1 \end{bmatrix}$$

$$F_7 = \begin{bmatrix} 1 & 2\pi f j L_{f4} \\ 0 & 1 \end{bmatrix}$$

$$F_4 = \begin{bmatrix} A_4 & B_4 \\ C_4 & D_4 \end{bmatrix}$$

$$A_4 = \frac{(2j\pi f L r 1 - 2j\pi f k \sqrt{L_{r1} L_{r2}})}{2j\pi f k \sqrt{L_{r1} L_{r2}}} - \frac{1}{(2\pi f)^2 C_{r1} k \sqrt{L_{r1} L_{r2}}} + 1$$

$$B_4 =$$

$$(2j\pi f L_{r1} - 2j\pi f k \sqrt{L_{r1} L_{r2}}) \left( 1 + \frac{2j\pi f k \sqrt{L_{r1} L_{r2}} + 2j\pi f L r 2 + \frac{1}{2j\pi f C_{r2}}}{2j\pi f k \sqrt{L_{r1} L_{r2}}} \right) +$$

$$\frac{\left( 1 + \frac{-2j\pi f k \sqrt{L_{r1} L_{r2}} + 2j\pi f L_{r2} + \frac{1}{2j\pi f C_{r2}}}{2j\pi f k \sqrt{L_{r1} L_{r2}}} \right)}{2j\pi f C_{r1}} -$$

$$2j\pi f k \sqrt{L_{r1} L_{r2}} + 2j\pi f L_{r2} - \frac{1}{2j\pi f C_{r2}} C_4 = 1 + \frac{1}{2j\pi f k \sqrt{L_{r1} L_{r2}}}$$

$$D_4 = 1 + \frac{2j\pi f k \sqrt{L_{r1} L_{r2}} + 2f\pi f L_{r2} + \frac{1}{2j\pi f C_{r2}}}{2j\pi f k \sqrt{L_{r1} L_{r2}}}$$

When the power transmission-side low pass filter and the power reception-side low pass filter in FIG. 2A are assumed to perform a Butterworth operation, $L_{f1}$, $L_{f2}$, $L_{f3}$, $L_{f4}$, $C_{f1}$ end $C_{f2}$ are expressed using the cutoff frequency $f_c$ and a load impedance $R_L$ of the power transmission system (that is, the power transmission device side) as follows.

$$L_{f1}=L_{f2}=L_{f3}=L_{f4}=R_L/2\pi f_c$$

$$C_{f1}=C_{f2}1/(2\pi f_c R_L \times 2)$$

The cutoff frequency $f_c$ is a parameter yet to be determined and is undefined here.

The power transmission-side resonator and the power reception-side resonator are assumed to have the same configuration and if it is assumed that the power transmission frequency (or resonance frequency) f=85 kHz, $L_{r1}=L_{r2}=31.2$ μH, $C_{r1}=C_{r2}=112.35$ nF, a coupling coefficient between the coils of the power transmission resonator and the power reception resonator k=0.6, an optimum load $R_L=2\pi f k L_{r1} 10\Omega$. Furthermore, the absolute value |T| of the inverse transfer function is calculated from the aforementioned equation (3) as follows.

$$|T|=\frac{\sqrt{\begin{pmatrix} 3.102E-4fc^{12}+5.165Efc^{11}+4.5E9fc^{10}- \\ 9.954E10*fc^9-4.527E19fc^8+5.292E20fc^7+ \\ 1.602E29fc^6-1.043E20*fc^5-2.324E38*fc^4+ \\ 6.684E38*fc^3+1.164E47fc^2+1.577E46fc+ \\ 2.748E54 \end{pmatrix}}}{fc^6} \quad 3.16$$

Figure 3:
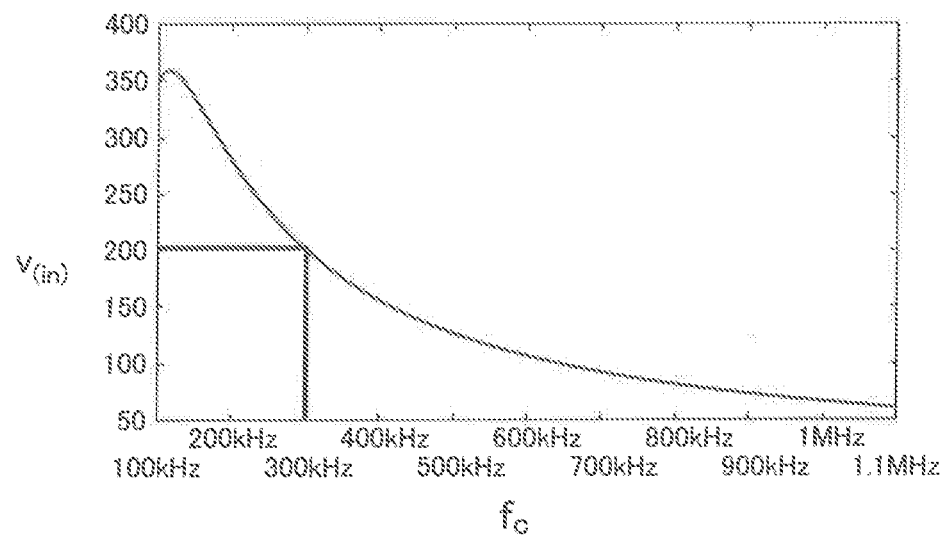
FIG. 3 is a diagram illustrating an example where parameter values of a low pass filter of the system in FIG. 1 are determined.

According to the aforementioned expression 1, the relationship among the cutoff frequency fc, output voltage (output voltage of the inverter) $v_{inv}$ of the AC power source is expressed as shown in FIG. 3. From this relationship, for example, when it is preferred to set the output voltage of the AC power source at the start of power-up to 200 V or below, parameter values (inductance, capacitance) of the respective elements in the power transmission-side low pass filter and the power reception-side low pass filter may be determined so that the cutoff frequency becomes 300 kHz or higher. For example, it may be possible to manufacture elements having the determined parameter values and form a low pass filter using the elements.

Figure 4:
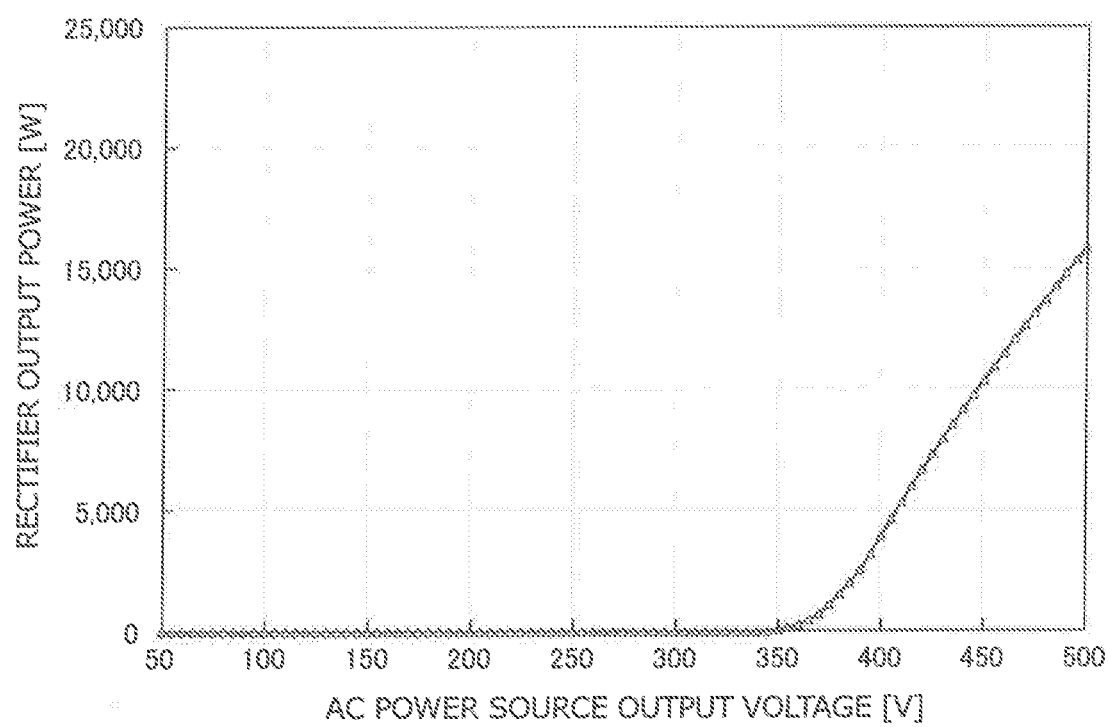
FIG. 4 is a diagram illustrating a characteristic between an output voltage of an AC power source and reception power of a battery in the system in FIG. 1.

FIG. 4 shows an example where power supplied to the battery 1 is calculated when the output voltage $v_{inv}$ of the AC power source 2 in the wireless power transmission system in which the parameter values of the respective elements are set is increased from 50 V up to 600 V in increments of 5 V using SPICE (Simulation Program with Integrated Circuit Emphasis) which is simulation software. A substantially constant amount of power is increased every time the output voltage $v_{inv}$ of the AC power source 2 is increased from approximately 370 V in increments of 5 V. Therefore, it can be confirmed that power is increased substantially uniformly as the output voltage of the AC power source 2 increases.

As described so far, according to the embodiment of the present invention, when a battery whose load fluctuates depending on supplied power is charged, it is possible to increase a power transmission voltage (or increase transmission power) without exceeding prescribed power.

Second Embodiment

Figure 5:
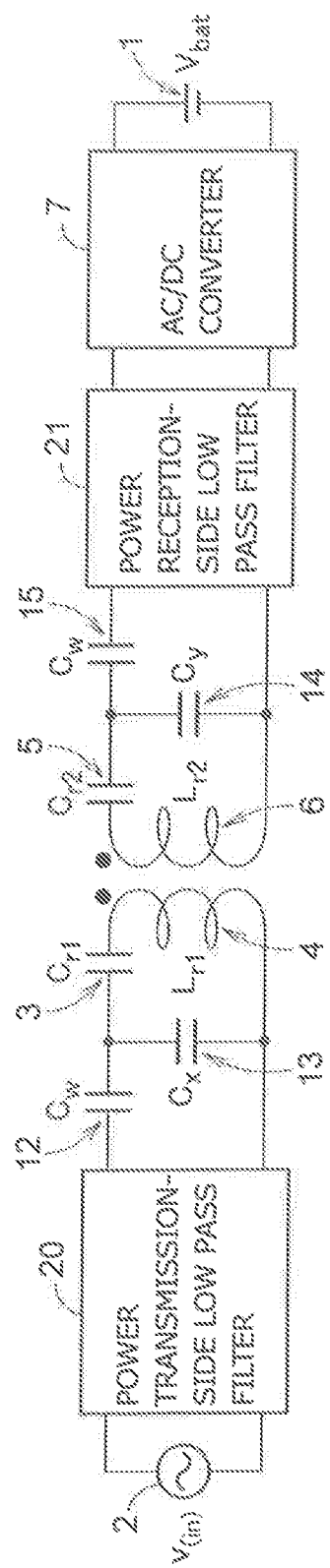
FIG. 5 is a diagram illustrating a wireless power transmission system according to a second embodiment.

FIG. 5 Illustrates a wireless power transmission system according to a second embodiment. This wireless power transmission system is provided with a power transmission device and a power reception device.

In the power transmission device, a power transmission-side adjustment series capacitor 12 and a power transmission-side adjustment parallel capacitor 13 are arranged between a power transmission-side low pass filter 20 and a power transmission resonator. The series capacitor 12 is connected in series to the capacitor 3 of the power transmission resonator and the power transmission-side adjustment parallel capacitor 13 is connected parallel to the coil 4 of the power transmission resonator. A capacitance of the power transmission-side adjustment series capacitor 12 is Cw and a capacitance of the power transmission-side adjustment parallel capacitor 13 is Cx.

A power reception-side adjustment series capacitor 15 and a power reception-side adjustment parallel capacitor 14 are arranged between a power reception-side low pass filter 21 and a power reception resonator of the power reception device. The power reception-side adjustment series capacitor 15 is connected in series to the capacitor 5 of the power reception resonator and the power reception-side adjustment parallel capacitor 14 is connected parallel to the coil 6 of the power reception resonator. A capacitance of the power reception-side adjustment series capacitor 15 is Cw and a capacitance of the power reception-side adjustment parallel capacitor 14 is Cy. The present embodiment assumes that the power transmission-side adjustment series capacitor 12 and the power reception-side adjustment series capacitor 15 have the same capacitance Cw value, but the capacitance Cw value is not limited to this.

Note that the power transmission-side low pass filter 20 and the power reception-side low pass filter 21 need not be the same as the power transmission-side low pass filter 10 and the power reception-side low pass filter 11 respectively in FIG. 1 (that is, parameter values determined according to the first embodiment need not be set). The power transmission-side low pass filter 20 and the power reception-side low pass filter 21 may be the same as the power transmission-side low pass filter 110 and the power reception-side low pass filter 111 in FIG. 13. The configuration other than the above-described configuration is similar to that in FIG. 1.

The present embodiment assumes a target system in which the power transmission-side low pass filter 20, the power transmission-side adjustment series capacitor 12, the power transmission-side adjustment parallel capacitor 13, the power transmission capacitor 3, the power transmission coil 4, the power reception coil 6, the power reception capacitor 5, the power reception-side adjustment parallel capacitor 14, the power reception-side adjustment series capacitor 15, the power reception-side low pass filter 21, and the AC/DC converter 7 are cascade connected.

Note that as described in the first embodiment, when the power transmission voltage is increased, the AC/DC converter 7 only has a function of increasing the load of the battery 1 at a constant rate, and so if the impedance of the AC/DC converter 7 and subsequent parts when seen from the power transmission-side is taken into consideration, the AC/DC converter 7 may be removed from consideration.

Parameter values (capacitances) of the power transmission-side adjustment series capacitor 12, the power transmission-side adjustment parallel capacitor 13, the power reception-side adjustment parallel capacitor 14, and the power reception-side adjustment series capacitor 15 are selected and set so that the inverse transfer function T (transfer function is 1/T) between the input voltage and the output voltage of the target system satisfies the expression 1 in the first embodiment. Therefore, the relationship between the output voltage of the AC power source and power supplied to the battery 1 becomes uniform for the same reason as that described in the first embodiment. Therefore, when charging the battery whose load fluctuates depending on the supplied power, it is possible to increase the power transmission voltage without exceeding defined power.

Figure 6:
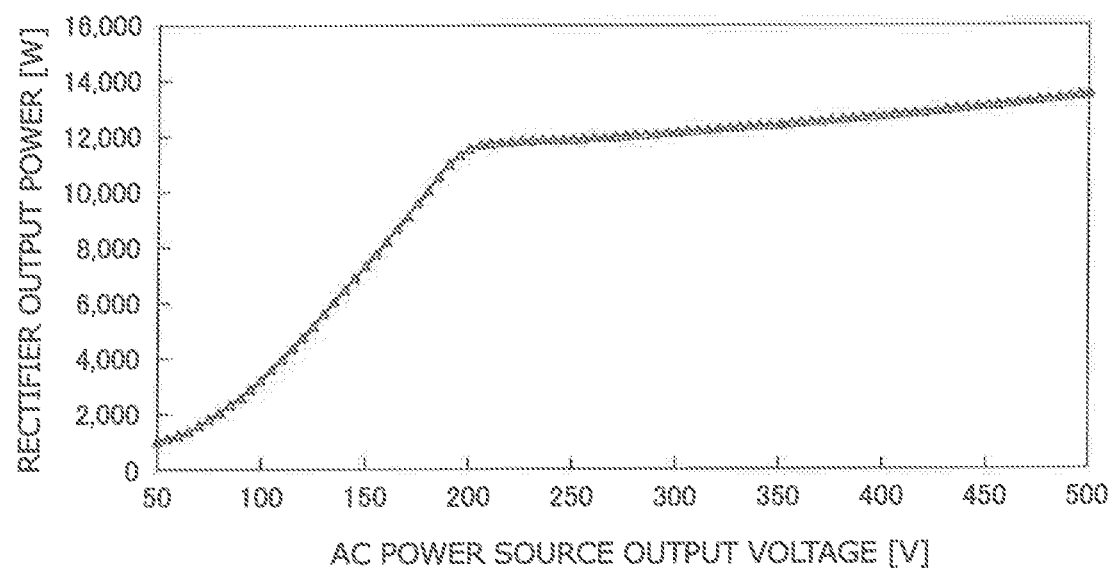
FIG. 6 is a diagram illustrating a characteristic between an output voltage of an AC power source and reception power of a battery in the system in FIG. 5.

FIG. 6 shows an example where the power supplied to the battery 1 is calculated using SPICE when the output voltage $v_{inv}$ of the AC power source 2 in the wireless power transmission system in FIG. 5 is increased from 50 V to 600 V in increments of 5 V. It can be confirmed that the transmission power increases substantially uniformly every time the output voltage increases from 50 V which is the output voltage $v_{inv}$ of the AC power source 2 in increments of 5 V.

Third Embodiment

Figure 7:
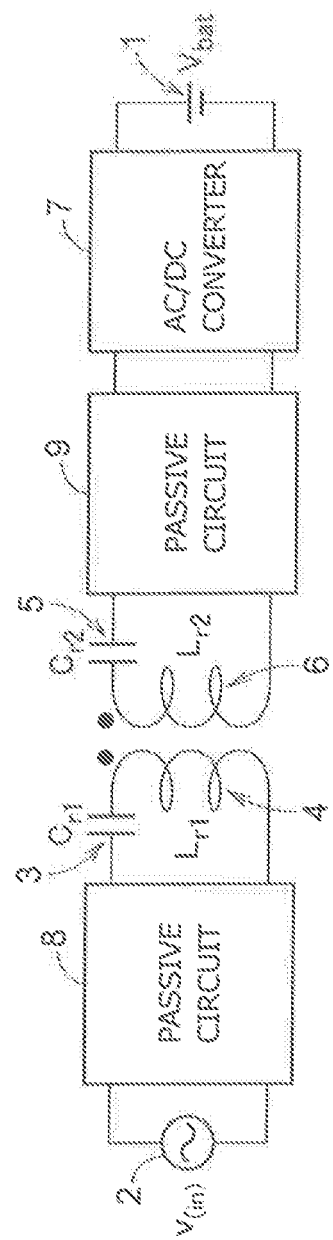
FIG. 7 is a diagram illustrating a wireless power transmission system according to a third embodiment.

FIG. 7 illustrates a wireless power transmission system according to a third embodiment. According to the first embodiment, the low pass filter is arranged between the AC power source and the power transmission resonator of the power transmission device, and the low pass filter is arranged between the power reception resonator and the AC/DC converter of the power reception device. According to the present embodiment, a passive circuit 8 is arranged between the AC power source 2 and the power transmission resonator of the power transmission device, and a passive circuit 9 is arranged between the passive resonator and the AC/DC converter 7 of the power reception device. The passive circuit 8 and the passive circuit 9 may be any circuits including at least one passive element (capacitor, coil or resistor or the like). The aforementioned power transmission-side low pass filter and power reception-side low pass filter are also examples of the passive circuits. The set of the power transmission-side low pass filter 20, the power transmission adjustment series capacitor 12 and the power transmission adjustment parallel capacitor 13 shown in FIG. 5 are also examples of the passive circuits. Moreover, the set of the power reception-side low pass filter 21, the power reception adjustment series capacitor 15 and the power reception adjustment parallel capacitor 14 shown in FIG. 5 are also examples of the passive circuits.

Figure 8A:
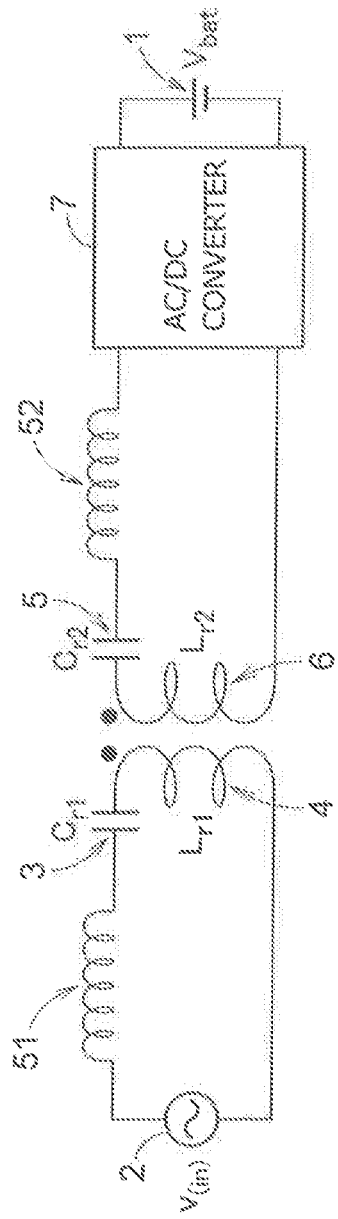
FIG. 8A, FIG. 8B and FIG. 8C each is a diagram illustrating a specific example of a passive circuit on the power transmission-side and the power reception-side in the system in FIG. 7.
Figure 8B:
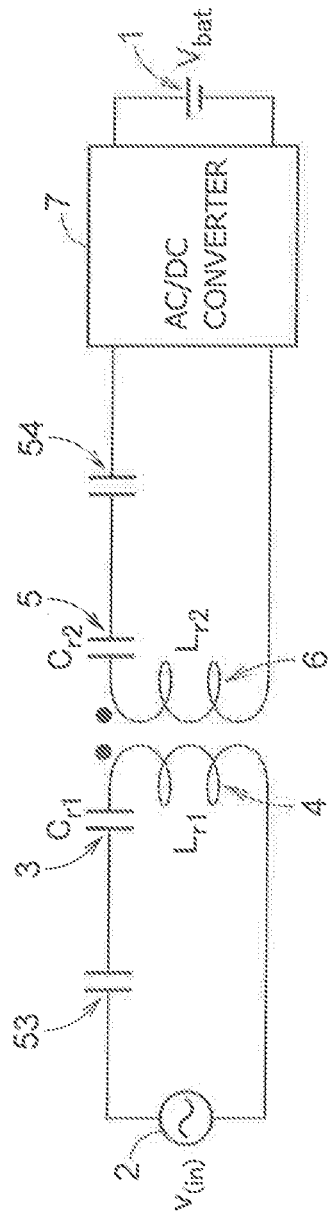
Figure 8C:
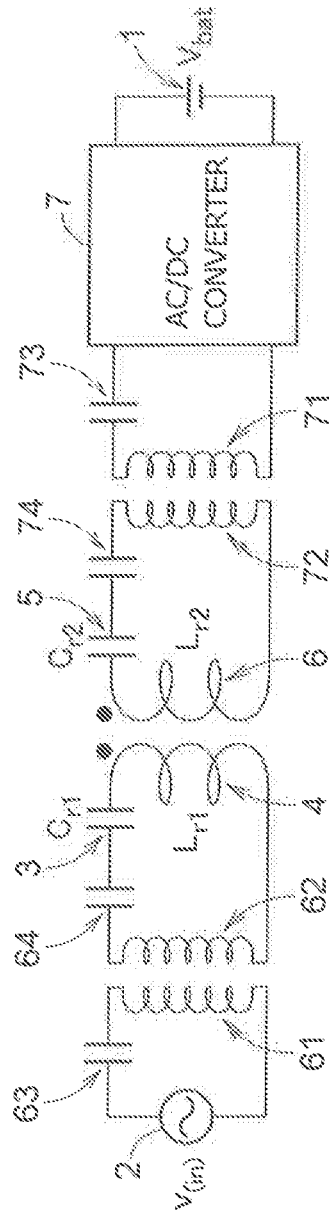

FIG. 8A to FIG. 8C illustrate embodied configuration examples of the passive circuit. FIG. 8A illustrates a case where the passive circuits 8 and 9 are constructed of coils 51 and 52 respectively. The coils 51 and 52 are connected in series to the capacitors 3 and 5 respectively, but the coils 51 and 52 may be connected in series to terminals of both terminals of the coils 4 and 6, opposite to the capacitors 3 and 5. Alternatively, two coils may be arranged on both sides of the coils 4 and 6.

FIG. 8B illustrates a case where the passive circuits 8 and 9 are constructed of capacitors 53 and 54 respectively. The capacitors 53 and 54 are connected in series to the capacitors 3 and 5 respectively, but the capacitors 53 and 54 may also be connected in series to terminals of both terminals of the coils 4 and 6, on sides opposite to the capacitors 3 and 5. Alternatively, two capacitors may also be arranged on both sides of the coils 4 and 6.

FIG. 8C illustrates a case where the passive circuits 8 and 9 are constructed of transformer circuits respectively. The passive circuit 8 is provided with mutually facing coils 61 and 62, a capacitor 63 connected between one end of the coil 61 and the AC power source 2 and a capacitor 64 connected between one end of the coil 62 and the capacitor 3. The passive circuit 9 is provided with mutually facing coils 71 and 72, a capacitor 73 connected between one end of the coil 71 and the AC/DC converter 7, and a capacitor 74 connected between one end of the coil 72 and the capacitor 5.

The examples shown in FIG. 8A to FIG. 8C are only examples and various other circuit configurations are also possible. For example, another capacitor or resistor or the like may be arranged between the coil 51 and the capacitor 3 in FIG. 8A or another capacitor may be arranged between the coil 51 and the capacitor 3, parallel to the coil 4.

The present embodiment assumes a target system in which the passive circuit 8, the power transmission capacitor 3, the power transmission coil 4, the power reception coil 6, the power reception capacitor 5, the passive circuit 9 and the AC/DC converter 7 are cascade connected.

Note that as described in the first embodiment, when the power transmission voltage is increased, the AC/DC converter 7 only has a function of increasing the load of the battery 1 at a constant rate, and so if the impedance of the AC/DC converter 7 and subsequent parts when seen from the power transmission-side is taken into consideration, the AC/DC converter 7 may be removed from consideration.

Parameter values of the passive circuit 8 and the passive circuit 9 are selected and set so that the inverse transfer function T (transfer function is 1/T) between the input voltage and the output voltage of the target system satisfies the expression 1 in the first embodiment. Therefore, the relationship between the output voltage of the AC power source and the power supplied to the battery 1 becomes uniform for the same reason as that described in the first embodiment. Therefore, when charging the battery whose load fluctuates depending on the supplied power, it is possible to increase the power transmission voltage without exceeding prescribed power.

Figure 9:
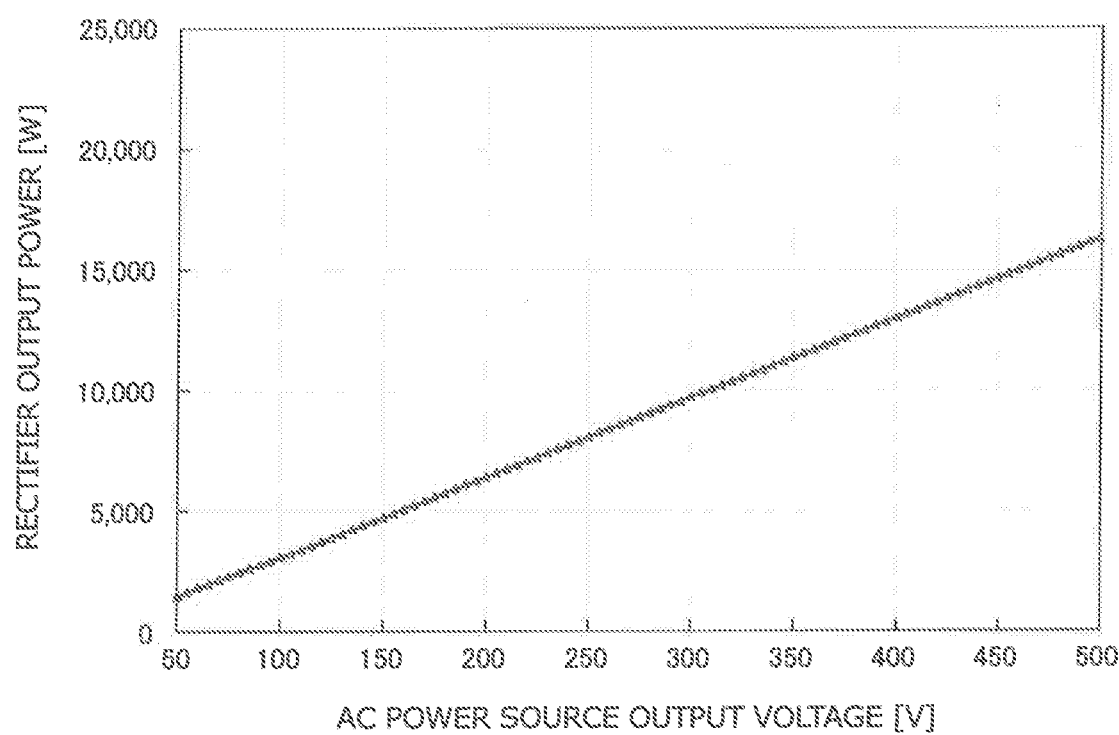
FIG. 9 is a diagram illustrating a characteristic between an output voltage of the AC power source and reception power of the battery in the system in FIG. 7.

FIG. 9 shows an example where the power supplied to the battery 1 is calculated using SPICE when the output voltage $v_{inv}$ of the AC power source 2 in the wireless power transmission system in FIG. 7 is increased from 50 V to 600 V in increments of 5 V. It can be confirmed that the transmission power increases substantially uniformly every time the output voltage increases from 50 V which is the output voltage $v_{inv}$ of the AC power source 2 in increments of 5 V.

Note that elements may also be included for cancelling influences of parasitic components generated in the wireless power transmission system as a passive element in the passive circuit 8 or passive circuit 9, that is, parasitic components (parasitic capacitance, parasitic inductor, parasitic resistor or the like) generated in the power transmission device or the power reception device. This makes it possible to correct the correlation relationship using (adding or the like) the elements after the mounting even when the correlation relationship (uniform relationship) between the output voltage of the AC power source and the reception power of the battery is deviated from a desired design due to manufacturing variations of the products (power transmission device or power reception device or the like) and mounting conditions. This makes it possible to perform stable control of powering on under a variety of conditions.

Fourth Embodiment

Figure 10:
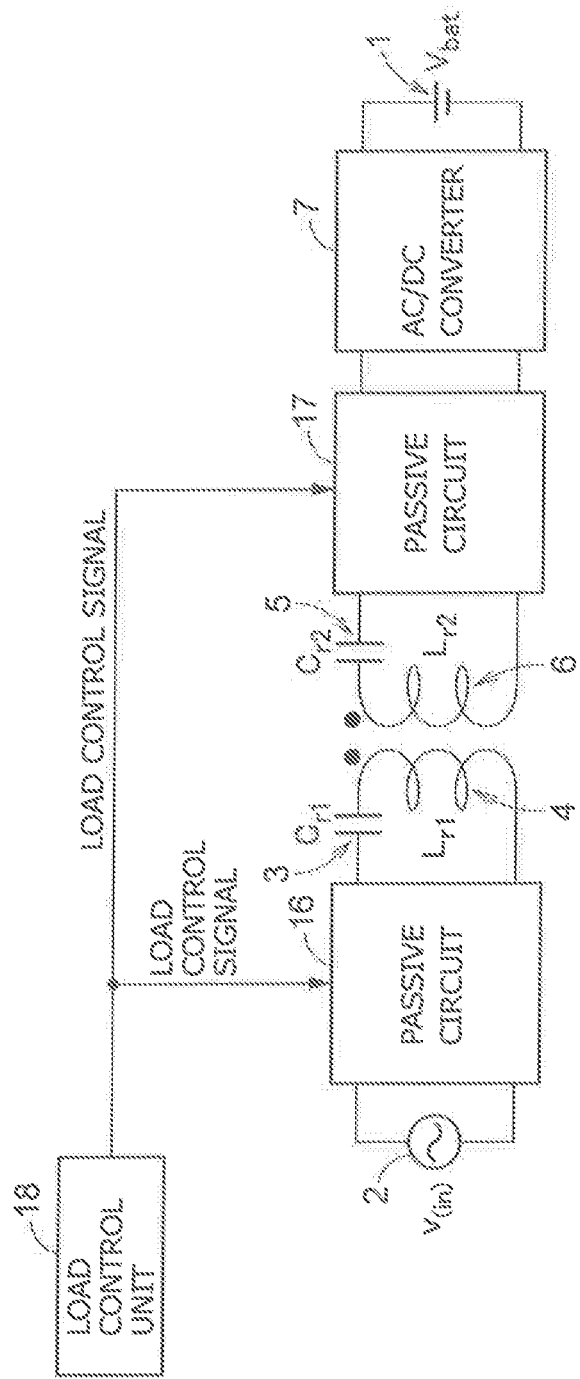
FIG. 10 is a diagram illustrating a characteristic between an output voltage of the AC power source and reception power of the battery in the system in FIG. 7.

FIG. 10 illustrates a wireless power transmission system according to a fourth embodiment. A passive circuit 16 is disposed between the AC power source 2 and the power transmission resonator of the power transmission device and a passive circuit 17 is disposed between the passive resonator and the AC/DC converter 7 of the power reception device. The passive circuits 16 and 17 as well as the passive circuit 16 and the passive circuit 17 in FIG. 7 are circuits that include at least one passive element (capacitor, coil or resistor or the like). Parameter values of elements in the passive circuit 16 and the passive circuit 17 can be changed according to load control signals supplied from a load controller 18. Examples of the elements include variable capacitance capacitors, variable inductance coils and variable resistors.

The load controller 18 is connected to the passive circuit 16 and the passive circuit 17, and configured to output a load control signal that specifies a parameter value to the passive circuit 16 and the passive circuit 17. The passive circuit 16 and the passive circuit 17 control the parameter value of each element according to the load control signal. This allows the load controller 18 to control the passive circuit 16 and the passive circuit 17 to a desired impedance.

The present embodiment assumes a target system in which the passive circuit 16, the power transmission capacitor 3, the power transmission coil 4, the power reception coil 6, the power reception capacitor 5, the passive circuit 17, and the AC/DC converter 7 are cascade connected.

Note that as described in the first embodiment, when the power transmission voltage is increased, the AC/DC converter 7 only has a function of increasing the load of the battery 1 at a constant rate, and so if the impedance of the AC/DC converter 7 and subsequent parts when seen from the power transmission-side is taken into consideration, the AC/DC converter 7 may be removed from consideration.

Parameter values of the passive circuit 16 and the passive circuit 17 are set so that the inverse transfer function T (transfer function is 1/T) between the input voltage and the output voltage of the target system satisfies the expression 1 in the first embodiment. Therefore, the relationship between the output voltage of the AC power source and power (output power of the AC/DC converter) supplied to the battery 1 becomes uniform for the same reason as that described in the first embodiment. Therefore, when charging the battery whose load fluctuates depending on the supplied power, it is possible to increase the power transmission voltage without exceeding prescribed power. Furthermore, when the parameter value is deviated from a design value, it is possible to control the load characteristics of the passive circuit 16 and the passive circuit 17 to a desired state from outside. Even when a correlation relationship (uniform relationship) between the output voltage of the AC power source and the reception power of the battery is deviated from a desired design due to manufacturing variations of products (power transmission device or power reception device or the like) and parasitic components generated depending on the mounting state, it is possible to adjust the parameter values of the elements from outside after the mounting and thereby correct the correlation relationship. This makes it possible to perform stable control of powering on under a variety of conditions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A wireless power transmission system comprising:
   an AC power source configured to generate an AC voltage;
   a power transmission resonator configured to generate a magnetic field corresponding to the AC voltage;
   a power reception resonator configured to receive AC power via the magnetic field;
   an AC/DC converter configured to convert the AC power to DC power and supply the DC power to a battery;
   a first circuit disposed between the AC power source and the power transmission resonator; the first circuit comprising at least one passive element; and
   a second circuit disposed between the power reception resonator and the AC/DC converter; the second circuit comprising at least one passive element;
   wherein parameter values of the passive elements in the first circuit and the second circuit are set so that an absolute value of an inverse transfer function between an input voltage and an output voltage of a target system at a frequency of the AC voltage is equal to or less than a divided value of the AC voltage by a battery voltage during a period of time when the AC voltage is increased from a first voltage value to a second voltage value, the target system comprising the first circuit, the power transmission resonator, the power reception resonator; the second circuit and the AC/DC converter.

2. The wireless power transmission system according to claim 1, wherein the first circuit and the second circuit each comprise a low pass filter.

3. The wireless power transmission system according to claim 1, wherein at least one of the first circuit and the second circuit receives a control signal for the passive element included in the at least one circuit, and
   the at least one circuit changes the parameter value of the passive element based on the control signal.

4. The wireless power transmission system according to claim 1, wherein at least one of the first circuit and the second circuit comprises, as the at least one passive element, an element cancelling an influence of a parasitic component generated in the wireless power transmission system.

5. The wireless power transmission system according to claim 1, wherein the at least one passive element in the first circuit comprises at least one of a resistor, a capacitor and an inductor, and
   the at least one passive element in the second circuit comprises at least one of a resistor, a capacitor and an inductor.

6. A power transmission device that wirelessly transmits power to a power reception device that supplies received power to a battery, comprising:
   an AC power source configured to generate an AC voltage;
   a power transmission resonator configured to generate a magnetic field that couples with the power reception device according to the AC voltage; and
   a first circuit disposed between the AC voltage source and the power transmission resonator; the first circuit comprising at least one passive element,
   wherein a parameter value of the at least one passive element in the first circuit is set so that an absolute value of an inverse transfer function between an input voltage and an output voltage of a target system at a frequency of the AC voltage is equal to or less than a divided value of the AC voltage by a battery voltage during a period of time when the AC voltage is increased from a first voltage value to a second voltage value, the target system comprising the first circuit, the power transmission resonator and the power reception device.

7. The power transmission device according to claim 6, wherein the target system comprises the first circuit, the power transmission resonator and the power reception resonator configured to receive the AC power via the magnetic field and an AC/DC converter configured to convert the AC power to DC power.

8. The power transmission device according to claim 7, wherein the target system comprises the first circuit, the power transmission resonator; the power reception resonator, a second circuit disposed between the power reception resonator and the AC/DC converter and configured to comprise at least one passive element and the AC/DC converter.

9. The power transmission device according to claim 6, wherein the first circuit comprises a low pass filter.

10. The power transmission device according to claim 6, wherein the first circuit receives a control signal for the passive element, and
the first circuit changes the parameter value of the passive element based on the control signal.

11. The power transmission device according to claim 6, wherein the first circuit comprises, as the at least one passive element, an element cancelling an influence of a parasitic component generated in the power transmission device.

12. The power transmission device according to claim 6, wherein the at least one passive element in the first circuit comprises at least one of a resistor, a capacitor and an inductor.

13. A power reception device that wirelessly receives power from a power transmission device, comprising:
a power reception resonator configured to receive AC power from a power transmission resonator of the power transmission device via magnetic field coupling;
an AC/DC converter configured to convert the AC power to DC power and supply the DC power to a battery; and
a first circuit disposed between the power reception resonator and the AC/DC converter, the first circuit comprising at least one passive element,
wherein a parameter value of the passive element in the first circuit is set so that an absolute value of an inverse transfer function between an input voltage and an output voltage of a target system at a frequency of the AC voltage is equal to or less than a divided value of the AC voltage by a battery voltage during a period of time when the AC voltage is increased from a first voltage value to a second voltage value, the target system comprising the power transmission resonator, the power reception resonator and the AC/DC converter.

14. The power reception device according to claim 13, wherein the target system comprises a second circuit disposed between an AC power source and the power transmission resonator of the power transmission device and configured to comprise at least one passive element, the power transmission resonator, the power reception resonator and the AC/DC converter.

15. The power reception device according to claim 13, wherein the first circuit comprises a low pass filter.

16. The power reception device according to claim 13, wherein the first circuit receives a control signal for the passive element, and
the first circuit changes the parameter value of the passive element based on the control signal.

17. The power reception device according to claim 13, wherein the first circuit comprises, as the at least one passive element, an element cancelling an influence of a parasitic component generated in the power reception device.

18. The power reception device according to claim 13, wherein the at least one passive element of the first circuit comprises at least one of a resistor, a capacitor and an inductor.

* * * * *